Aug. 13, 1968   R. A. McCARROLL   3,396,772
TIRE STUD
Filed Sept. 2, 1966
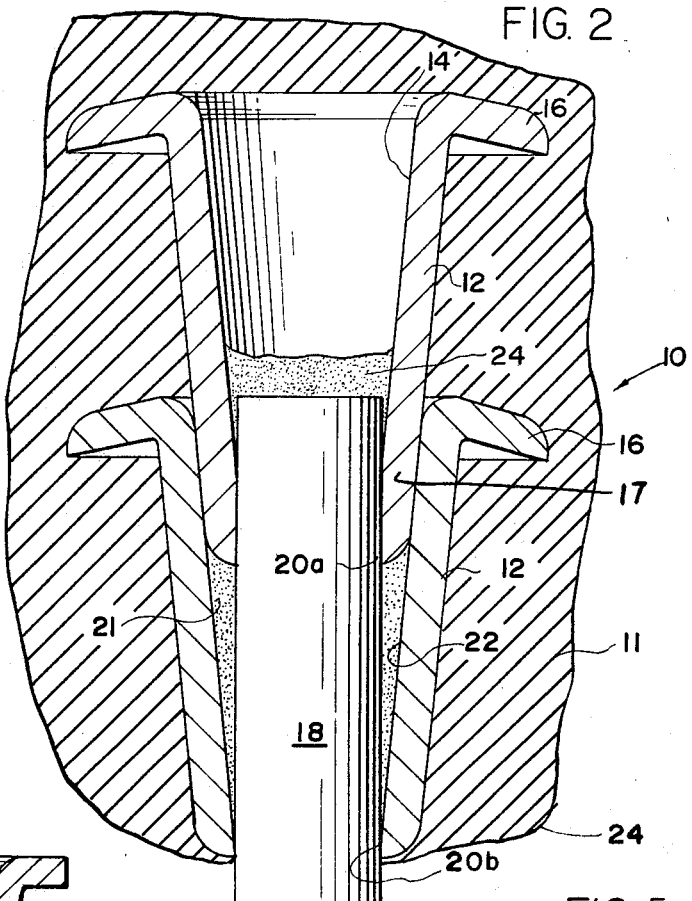
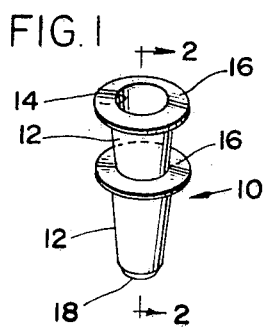
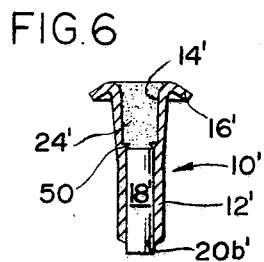
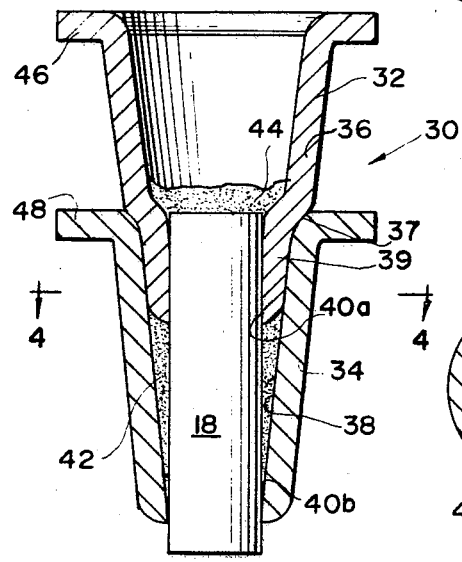
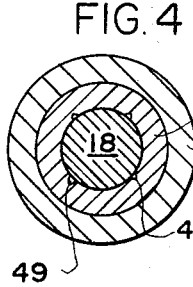
INVENTOR
RAYMOND A. McCARROLL
BY Bair, Freeman & Molinare
ATTORNEYS.

United States Patent Office 3,396,772
Patented Aug. 13, 1968

3,396,772
TIRE STUD
Raymond A. McCarroll, Grosse Pointe Woods, Mich., assignor to Studebaker Corporation, a corporation of Michigan
Filed Sept. 2, 1966, Ser. No. 577,581
2 Claims. (Cl. 152—210)

ABSTRACT OF THE DISCLOSURE

A tire stud comprised of two like flanged tubular body members joined to one another to form a double flanged body and a wear-resistant insert secured in the bores in said tubular body members and projecting slightly from an end of the double flanged body.

---

This invention relates to anti-skid devices or tire studs for use in the treads of vehicle tires to increase traction and improve the anti-skid properties of such tires.

The advantages of using anti-skid devices to increase the friction of vehicle tires under icy conditions have long been known and various forms of anti-skid devices have been employed. Heretofore use in the United States of anti-skid devices has been restricted, but recently more extensive use of these devices has been made.

One form of prior anti-skid device comprised a plurality of solid metallic spikes affixed to a tire. More recently, anti-skid devices have taken the form of a body member having a hardened wear-resistant insert secured therein. The body has sometimes been formed of aluminum or plastic-like material, but steel bodies have been preferred because of their better wearing characteristics. The insert may be made of an extremely hard material, such as cemented tungsten carbide or a cobalt and tungstem carbide alloy, and secured in the body by brazing or bonding with a suitable chemical adhesive or by a force fit.

The parts of the stud must be made with precision in order to obtain a finished tire stud wherein the insert extends a fixed predetermined distance from an end of the body opposite the flange thereon and wherein a positive securement is provided between insert and the body. In one recent commercial types of tire stud, a substantially cylindrical insert is supported in a substantially cylindrical blind bore within the body and secured thereto by brazing. In another recent form of commercially acceptable anti-skid device, a tapered insert is inserted into a tapered bore in the body, which bore converges from the end of the body opposite the flange end toward the flange end of the body. In this latter type device, the insert is forced into the tapered bore to secure the insert within the body.

In both types of tire stud, the dimensions of the bore and of the insert are quite critical in order to properly position the insert within the body to provide for a positive securement without splitting the sides of the body and without breaking the insert, while at the same time providing for the desired fit between the two members. Assembly problems sometimes occur in locating an insert in a blind bore in a body. Fabrication of a tapered insert is more expensive than fabrication of a cylindrical insert.

An object of this invention is to provide an improved tire stud that can be readily made by high speed mass production techniques to reduce the cost thereof and that can be readily affixed in the tread portion of vehicle tires to improve the traction and anti-skid properties of the tires.

Another object of this invention is to provide an improved tire stud comprising metal body means formed of like tubular bodies, each body having a tapered bore therein which tapers from the flange end of the body toward the end of the body remote from the flange end, a cylindrical wear resistant insert insertable into the tapered bores and adapted to extend through the end of the bore opposite from the flange end, the insert being positively bonded to the body means to provide for long life of the tire stud. Other objects and advantages of the present invention will be made more apparent hereinafter.

The specific structural details of the invention and their mode of operation will be made most manifest and clearly pointed out in full, concise and exact terms in conjunction with the accompanying drawing wherein:

FIG. 1 is a perspective view of a double flanged tire stud employing the principles of the present invention;

FIG. 2 is a cross-sectional view taken generally along line 2—2 of FIG. 1, illustrating the tire stud in position in the tread of a vehicle tire;

FIG. 3 is a cross-sectional view of a modified double flanged tire stud;

FIG. 4 is a transverse cross-sectional view taken generally along the line 4—4 of FIG. 3 and illustrating the scoring or grooving in the body member for permitting the solder or brazing material to flow into the area between the insert and the tubular body to effect a high quality bounding between the body and the insert;

FIG. 5 is a cross-sectional view of another modification embodying the principles of the present invention, such stud having only a single flange; and FIG. 6 is a cross-sectional view of another form of a single flange stud having mechanical stop means for further fixing the insert in the body.

Referring now to FIGS. 1 and 2, there is shown a tire stud 10 disposed in position in the thread of an automobile tire 11. As is known in the art, the tire stud 10 may be mounted into the tread of the vehicle tire during fabrication thereof or the studs may be inserted into holes formed in the tread of the vehicle tire, which is commonly made from rubber.

The tire stud 10 comprises body means defined by a plurality of like flanged tubular body members 12. The body members 12 are each preferably made from hard metal, such as steel, and include a bore 14 extending entirely through the body member. The body members may be fabricated from other materials having characteristics equivalent to that of steel with respect to heat resistance, strength and wear qualities. At one end of each body member 12 there is defined an annular outwardly extending flange portion 16. The flange or head 16 is preferably disc-like and circular in cross section, although other configurations may be used if desired. The bore 14 within each body member 12 tapers or converges from the flanged end of the body member toward the other end. The significance of the taper of the bore will become more apparent hereafter.

The walls of each body member 12 are substantially uniform cross-section and therefore the exterior surfaces taper generally in the same manner as the walls defining the bore 14. The body members are sized so that the end 17 of one body member 12 remote from the flanged end 16 is adapted to be received in the bore of the other body member adjacent the flanged end.

A feature of this invention is the manner in which the wear-resistant rod-like insert 18, which may be fabricated from a hardened material such as cemented tungsten carbide or a cobalt and tungsten carbide alloy, is secured within the bores 14 extending through the body portions 12. Preferably the wear-resistant insert 18 is cylindrical in cross section and is of an external diameter slightly larger than the internal diameter in the portion of the bore 14 in each body portion 12 remote from the flanged end 16 of each body portion. Thus, there is a force fit between each body portion 12 and the wear-resistant insert 18 in the areas indicated generally at 20a and 20b.

In addition a bonding agent 21 such as a low melting point silver solder or copper or a thermo curing adhesive is permitted to flow into the annular space 22 defined between by the insert 18 and the body members 12. The bonding material 21 will also be deposited in the area 24 above the insert within the bore 14 of the upper body member 12 (as seen in FIG. 2) to further enhance the bonding between the wear-resistant insert and the body means.

The use of a cylindrical insert is preferred in the present invention since a cylindrical insert is generally less expensive than a tapered insert. The insert 18 is securely locked in place within the bore extending through the body means by the bonding agent 21 disposed in the areas indicated at 22 and 24 and also by the intereference fit of the insert 18 with respect to the body portions 12 in the areas 20a and 20b. In addition, there is a collet effect between the end 17 of the upper tapered body portion 12 and the insert 18 for further locking the insert in place. The walls of the outer body portion 12 adjacent to the lower end 17 of the upper body portion reinforce and strengthen the walls of the upper body portion adjacent the area of joinder to the insert and the walls of the end 17 are compressed between the insert and the upper end of the lower body portion 12 so as to define a wedge for more securely retaining the insert in place in the body.

As seen in FIG. 2, the end of the insert 18 extends beyond the end of the lower body portion 12 a predetermined amount. When the tire stud 10 is in place in the tread of the tire 11 the end of the tire stud 10 extends beyond the road-engaging surface 24 of the tread so that the tip of the tire stud may engage with the road surface.

As shown in FIGS. 1 and 2 the body portions 12 may each be rivet-like and generally circular in transverse cross-section. The insert 18 extends beyond the lower end of the body means so that it can engage the road. The tire stud 10 is formed with two flanges 16 for stabilizing the tire stud in place in the bore within the tire tread and for preventing the stud from being moved inwardly toward the fabric or like plies of the tire so as to prevent damage to the plies during use of the tire having tire studs therein.

Referring now to FIGS. 3 and 4 there is shown a modified tire stud 30 embodying the principles of this invention. The upper body portion 32 is not identical to the lower body portion 34. The upper body portion 32 is provided with a reduced diameter portion indicated generally by the numeral 36 intermediate the ends thereof which defines a shoulder 37. The shoulder 37 on the exterior surface of the body portion 32 cooperates with the inner surface of the bore 38 through the lower body portion 34 and defines a stop to limit the entry of the upper body portion 32 into the lower body portion 34. There is a complementary taper between the wall means defining the tapered bore 38 in the body portion 34 and the exterior surface of the lower end portion 39 of body portion 32.

As in the embodiment of FIGS. 1 and 2, there is a force fit between the external surfaces of the insert 18 and the lower ends of the body portions 32 and 34 respectively, as indicated in the areas 40a and 40b. The securement between the insert and the body means is further enhanced by the use of bonding material, as for example silver solder, copper brazing, or thermo curing adhesives, in the areas indicated at 42 and 44.

The flanges 46 and 48 may extend generally at right angles to the longitudinal axis of the body means as shown in FIG. 3 or they may extend at right angles to the walls of the body portion and therefore at an acute angle to the axis of each body portion 12, as seen in FIG. 1. The flanges 46 and 48 may be circular or, if desired, they could beformed in other shapes, as for example the flanges could be square in cross section. Furthermore, the flanges on the body portions could be flat or the surfaces thereof could be grooved to provide additional surface to restrict rotation of the tire stud in a radial bore in the tire tread.

It is intended that the bonding material will be deposited in a ball or pellet from on top of the insert 18 when in the position shown in FIG. 3, for example, and that the stud will be heated to melt the low melting point silver solder or copper ball to permit the material to flow and fill the spaces indicated at 42 and 44. If the bonding agent is a thermo curing adhesive, it can be injected into stud from the top thereof and then be permitted to set to bond the insert and body firmly to one another. Ordinarily, the lower end of the insert 18 will longitudinally score or groove the internal surface of the bore 38 at the lower end 39 of the body portion 32. In the event that the bonding material does not flow through into the space 42 between the body portions 32 and 34 and the insert 18 due to the fact that there is insufficient scoring of the lower internal surface of the bore 38 in the area indicated at 40a, then the body portion or casing 32 may be provided with grooves or recesses 49, as indicated in FIG. 4, to assure the flow of bonding material (e.g. silver solder, copper, or thermo curing adhesives) into the space 42. It will be apparent that the lower portion 39 of the body portion 32 may be made non-circular so as to provide spaces or channels between the bore defined therein and the exterior surface of the insert 18 to permit the flow of solder or brazing material into the space 42.

In FIG. 5 there is shown a further modification of the present wherein certain principles of the invention are embodied in a sigle flanged stud 10'. The stud comprises a rivet-like housing or body member 12' having a tapered bore 14' extending therethrough for receiving an insert 18 therein. A flange 16' extends laterally from the flange adjacent the end of the bore 14' having the larger opening. The space 14' above the insert 18' and within the bore 14' of the tire stud may be filled with bonding material to bond the insert in place with housing 12'. It will be understood that bonding material will flow along the sides of the insert 18' to fill the tapered space between the sides of the insert and the wall means defining bore 14' in housing or body 12'. The bore 14' may be tapered uniformly from the larger opening adjacent the flanged end of the body 12' to the smaller opening at the end of the body 12' remote from the flanged end. Alternatively, the bore 14' could taper uniformly from the larger opening adjacent the flange 16' to about the midpoint of the body and then be substantially uniform in cross section over the remainder of the body. In the latter event, there would be substantially an interference fit between the insert and substantially uniform cross section of the bore. As shown in FIG. 5, the insert 18' is in engagement with the wall means defining the lower portion of bore 14' over a major portion of the length of the insert.

Referring to FIG. 6, there is shown another form of stud having mechanical stop means 50 for assuring that the insert 18' will be retained in place in body 12. The stop means may be formed from material upset from the sides of bore 14' and may include one or more inwardly extending projections or may be formed as an annular ring-like member or the stop means could be formed by swaging the body of the stud.

The present invention lends itself to high speed mass production techniques. For example, considering the fabrication of the double-flanged studs of FIGS. 1 and 2, the body portions may be suitably formed from two strips of sheet steel material, for example, by progressive die means. The body portions defining the upper parts of a completed tire stud may be cut from the upper strip and assembled into the body portions which remain secured to the other strip. Suitable press means are used to force the upper body portion into the enlarged end of the bore in the lower body portion. The upper body portion is forced into the lower body portion to a predetermined depth. The cylindrical insert is then positioned in the enlarged upper end of the upper body portion and forced into place within the two body portions such that the lower end of the insert extends a predetermined distance from the lower end of the lower body portion. The parts of the stud are retained in position relative to one another in view of the frictional engagement or force fit between the insert and body portions in the areas of smaller bore cross section.

A ball or pellet of a low melting point fastening material such as silver solder or copper is dropped in position on top of the insert within the bore of the upper body portion. The strip containing a plurality of semi-finished tire studs is then passed through a gas, electric or induction furnace to melt the solder of copper and thereby rigidly secure the insert in place within the body portions. It will be understood that a thermo curing adhesive may be used in place of the silver solder or copper to secure the body and insert together. After a suitable cooling off period the finished studs may be separated from the strip of metal to which they were affixed. If desired, a protective plating of cadmium, zinc, copper or other metallic or plastic coatings may be employed.

It is noted that there may be a space above the insert in the tapered bore, as seen in FIGS. 2 and 3, or if desired the space may be filled, as seen in FIG. 5.

The exterior surfaces of the insert and the internal surfaces of the body portions may be copper plated to give a "tinning" effect for assisting the bonding of the insert within the body of the tire stud. Furthermore, when silver solder or copper brazing are employed, it is preferred that the tire studs be heated in an atmosphere of an inert gas in order to minimize undesirable oxidation and thereby increase the strength of the bond between the insert and the body.

It will be understood that the body of the stud can also be made from drawn wire or from standard mill stock.

The double flanged tire stud of the present invention as shown in FIGS. 1 and 2 is preferably formed from identical stamped rivets or body portions suitably joined to one another and to the insert secured within tapered bores in each body portion. If desired, the central flange (i.e., the flange on the lower body portion) may be eliminated or it may be made larger or smaller than the flange on the inner end of the tire stud (i.e., the flange on the upper body portion) for different applications. The present invention can be embodied in double flanged studs, as shown for example in FIGS. 1 and 3 or it can be applied to a single flange stud, as shown in FIG. 5. Fabrication in either case is significantly enhanced by providing a bore which tapers or converges from the flanged end of the tire stud toward the other end and inserting and bonding into such bore a substantially cylindrical wear-resistant insert formed from a hard material, such as cemented tungsten carbide.

While I have described presently preferred embodiments of the invention, it will be understood that the invention is not limited thereto since it may be otherwise employed in the scope of the following claims.

I claim:
1. A tire stud comprising elongated, tubular metallic body member means having a bore extending therethrough, flange means extending generally laterally from the body member means at one end thereof, said bore being tapered and reducing in transverse cross-section from said one end toward the other end of the body member means, a wear-resistant, rod-like insert disposed in said bore and extending slightly from said other end of said body member means, there being a force fit between the wear-resistant insert and the body member portion defining the bore adjacent said other end of the body member means, and means for securing the wear-resistant insert in place in said bore, said body member means comprising a pair of like, elongated tubular metallic members, each having a tapered bore extending therethrough and a flange extending laterally from the member at one end thereof, the tapered bore reducing in transverse cross-section from an enlarged opening adjacent the flanged end toward the other end of each member, the exterior walls of each member tapering toward said other end, the reduced end of one member remote from the flanged end being inserted into the enlarged opening in the other member and being affixed to said other member, the wear-resistant, rod-like insert being disposed in said bore in each member and extending from said other end of said other member.

2. A tire stud comprising elongated, tubular metallic body member means having a bore extending therethrough, flange means extending generally laterally from the body member means at one end thereof, said bore being tapered and reducing in transverse cross-section from said one end toward the other end of the body member means, a wear-resistant, rod-like insert dispsoed in said bore and extending slightly from said other end of said body member means, there being a force fit between the wear-resistant insert and the body member portion defining the bore adjacent said other end of the body member means, and means for securing the wear-resistant insert in place in said bore, said body member means comprising a first body member and a second body member, said first body member having a flange extending laterally from one end thereof and having a bore therethrough, said bore converging from a larger opening adjacent said one end to a smaller opening adjacent the other end, a second body member having a bore therethrough, said bore in said second body member converging from a larger opening adjacent one end to a smaller opening adjacent the other end, said other end of said first body member being secured within the bore in said one end of said second body member with a wedge fit, the wear-resistant insert being disposed in said bores in the first and second body members and extending slightly from said other end of said second body member, said wear-resistant insert engaging areas adjacent the other ends of the first and second body members with a force fit.

References Cited
UNITED STATES PATENTS

| | | | |
|---|---|---|---|
| 2,467,418 | 4/1949 | Alexiadis | 152—210 |
| 2,982,325 | 5/1961 | Pellaton | 152—210 |
| 3,220,455 | 11/1965 | Sowko | 152—210 |
| 3,230,997 | 1/1966 | Carlstedt | 152—210 |

ARTHUR L. LA POINT, *Primary Examiner.*

C. B. LYON, *Assistant Examiner.*